United States Patent [19]
Wills, Jr.

[11] 4,407,677
[45] Oct. 4, 1983

[54] CONCRETE MASONRY UNITS INCORPORATING CEMENT KILN DUST

[75] Inventor: Milton H. Wills, Jr., Catonsville, Md.

[73] Assignee: Martin Marietta Corporation, Bethesda, Md.

[21] Appl. No.: 365,425

[22] Filed: Apr. 5, 1982

[51] Int. Cl.³ .............................................. C04B 7/35
[52] U.S. Cl. .................................... 106/97; 106/118
[58] Field of Search .......................... 106/97, 118, 120

[56] References Cited

U.S. PATENT DOCUMENTS

| | | | |
|---|---|---|---|
| 2,527,776 | 10/1950 | Rule | 106/97 |
| 3,501,323 | 3/1970 | Moorehead et al. | 106/97 |
| 3,953,222 | 4/1976 | Bainton | 106/97 |
| 4,018,617 | 4/1977 | Nicholson | 106/85 |
| 4,026,716 | 5/1977 | Urschell et al. | 106/97 |
| 4,038,095 | 7/1977 | Nicholson | 106/118 |
| 4,101,332 | 7/1978 | Nicholson | 106/85 |
| 4,268,316 | 5/1981 | Wills, Jr. | 106/97 |

Primary Examiner—James Poer
Attorney, Agent, or Firm—Herbert W. Mylius; Gay Chin

[57] ABSTRACT

A composition for the preparation of concrete block, comprising aggregate, cement, and cement kiln dust.

7 Claims, No Drawings

CONCRETE MASONRY UNITS INCORPORATING CEMENT KILN DUST

FIELD OF INVENTION

The present invention is related to the manufacture of poured, molded, or pressed concrete products such as concrete blocks or bricks, and to the improved products themselves, resulting from the utilization of cement kiln dust as a replacement for fly ash or pozzolan.

BACKGROUND OF THE INVENTION

It is conventional practice to manufacture concrete masonry units, such as concrete block or brick, utilizing portland cement in combination with aggregate. Prior practice has mixed one part of cement with ten parts aggregate, conventionally fine and coarse aggregate, usually in the form of sand and gravel or crushed stone. Small amounts of other materials can be added to promote or retard the reactions or to give desired properties to the cement. Portland cement is essentially a calcium-alumina-magnesia-silicate composition. Addition of water to a dry mixture of portland cement results in a series of crystalization reactions by virtue of which the concrete attains the strength necessary for use in building products. Due to the complexity of the various chemical reactions, much investigation has been given both to reaction conditions and reactants, to determine their effect on cured products. Such research has influenced the establishment of uniform quality standards for cement, as set forth by the American Society for Testing Materials (ASTM).

Among many additives utilized in the preparation of concrete and concrete block products are such materials as sulfates, as retarders, chlorides as accelerators, and pozzolans. These pozzolans materials in themselves have no cementitious or binding quality, but react with lime in the presence of water to form cementitious materials. Pozzolans include such materials as fly ash, silica flour, and silica-containing substances such as powdered brick, burned shale, and some slags. Suitable fly ash compositions for preparation of cement block include any of those fly ash compositions set forth by ASTM C 618, "Standard Specification for Fly Ash and Raw or Calcined Natural Pozzolan for use as a Mineral Additive in Portland Cement Concrete". Generally produced from the burning of pulverized bituminous coal, and collected in large quantities by electrostatic precipitation, fly ash has been suggested as a suitable fine aggregate for concrete. For example, Nelles, U.S. Pat. No. 2,250,107 discloses the use of fly ash having an approximate chemical composition of about 43% silica, 25% alumina, 15% iron oxide, 2% calcium oxide, and 1% magnesia, as an aggregate for concrete. Rule, U.S. Pat. No. 2,527,766, suggests the preparation of building materials from fly ash by the use of small percentages of portland cement in combination with up to 85% fly ash. In addition, Bainton, U.S. Pat. No. 3,953,222, teaches a method for making concrete products, in which pozzolans are added to the concrete (or substituted for some of the portland cement therein) after acidulation of the pozzolan material with a strong mineral acid. Bainton teaches the preparation of cement block from compositions comprising 80% aggregate, 10% cement, and 10% pozzolan (fly ash).

In addition to the above, the prior art also teaches the combination of aggregate, cement, and lime kiln dust. Urschel, U.S. Pat. No. 4,026,716, teaches a cement composition, suitable for preparation of concrete block, incorporating a precipitate comprising CaO-MgO from the gaseous effluent from a kiln burning dolomitic limestone. The patentee indicates that from 5 to 15 weight percent of this lime kiln dust may be used, in combination with portland cement, limestone aggregate, and manufactured fine aggregate (obtained from the operation of a dolomitic limestone quarry). The manufactured fine aggregate, referred to in the trade as "manufactured sand", contains about 30% by weight calcium, calculated as CaO, and about 22 percent magnesium, calculated as MgO.

Nicholson, in U.S. Pat. No. 4,038,095, teaches a mixture consisting essentially of fly ash, lime stack dust, and aggregate, which through pozzolanic reactions produce a hard, strong, durable mass capable of supporting surfacing. Specifically, the patent teaches preparation of a pavement base utilizing from 71 to 85% aggregate, from 10 to 14% fly ash, and from 5 to 15% lime stack dust. The lime stack dust, from the precipitator of a limestone kiln, contains a mixture of raw kiln feed, partly calcined material, and finely divided material. Typically lime stack dust has a chemical composition of CaO, MgO, S, and $CO_2$. When mixtures made in accordance with the invention set forth by Nicholson are mixed with water to produce a pozzolanic reaction, the mixtures meet or exceed the ASTM specifications for fly ash and other pozzolans for use with lime.

However, certain problems are inherent in the use of lime or lime stack dust. Slaking or hydration of the lime must be closely supervised to ensure that hydration is thorough, and in the manufacture of concrete block structures, difficulties are often encountered, due to the lack of cementitious quality of the lime, which has no significant silicate content.

SUMMARY OF THE INVENTION

In accordance with the invention, a cement block composition is prepared which consists essentially of cement (i.e. portland cement), aggregate, and cement kiln dust. Results of laboratory studies indicate that fly ash may be replaced by cement kiln dust on an equal basis, while increasing compressive strength. Further, tests show that cement content can be reduced by 10 to 20% while strength of the finished block product increases.

It is thus an object of the present invention to provide a composition for the manufacture of concrete or cement block structures utilizing aggregate, cement, and cement kiln dust. It is a further object of the present invention to replace the conventionally utilized fly ash or pozzolan material utilized in concrete block manufacture with cement kiln dust. Thus, it is a still further object of the present invention to provide a means for utilization of a waste product, cement kiln dust, resulting from the manufacture of portland cement.

It is also an object of the present invention to provide a concrete block structure having improved compressive strength characteristics, utilizing cost advantageous materials. These and other objects, features, and advantages of the present invention will become apparent from the following detailed descriptions.

DESCRIPTION OF THE PREFERRED EMBODIMENTS

Conventional concrete block compositions are roughly composed of 10 parts aggregate, 0.8 parts cement, and 0.2 parts fly ash. According to the present invention, an improved cement block composition may be produced by blending 10 to 12 parts aggregate, 0.4 to 0.9 parts cement, and 0.1 to 0.6 parts cement kiln dust. It is preferred to employ from 0.5 to about 0.8 parts cement, and from about 0.2 to about 0.5 parts cement kiln dust. Any cement which complies with ASTM C 150 has been found satisfactory for manufacture of this product.

Suitable grades of cement are those which meet the standards of ASTM C 150, "Standard Specification for Portland Cement". Said Standard Specification covers eight types of portland cement, including Type I, which is set forth as being "for use when the special properties specified for any other type are not required". It is to be understood that other types of portland cement may also be utilized in the present invention, when the special properties thereof are particularly desired. For example, Type III portland cement may be utilized in the present invention, when high early strength is considered desirable. The cements particularly of value in the present invention comprise hydraulic cements produced by pulverizing clinker consisting essentially of hydraulic calcium silicates, usually containing one or more of the forms of calcium sulfate as an interground addition to prolong set.

The kiln dust suitable for utilization in the present invention is preferably obtained from the clinkering process utilized in the preparation of portland cement. Typical chemical compositions of kiln dust components suitable for use in the present invention are set forth in Table I. Table I also sets forth physical properties of such materials. Although the Table is specific to certain identified materials, other kiln dusts having differing compositions, may also be used.

TABLE I

| Miscellaneous Properties of Kiln Dust | | | | |
|---|---|---|---|---|
| | Kiln Dust | | | |
| | M | T | R | L |
| Oxide Analysis: Percent | | | | |
| $SiO_2$ | 16.1 | 13.7 | 12.3 | 16.9 |
| $Al_2O_3$ | 4.6 | 3.5 | 3.3 | 5.3 |
| $Fe_2O_3$ | 1.9 | 2.0 | 2.9 | 3.1 |
| CaO | 51.4 | 46.7 | 54.1 | 54.3 |
| MgO | 0.7 | 2.4 | 1.0 | 1.0 |
| $SO_3$ | 7.0 | 4.1 | 2.7 | 4.2 |
| $K_2O$ | 1.8 | 3.5 | 1.2 | 1.0 |
| $Na_2O$ | 0.3 | 0.4 | 0.1 | 0.3 |
| LOI | 19.5 | 24.8 | 30.1 | 13.6 |
| IR | 9.9 | 12.0 | 10.7 | 11.9 |
| Physical Properties | | | | |
| Specific Gravity | 2.80 | 2.81 | 2.76 | 2.81 |
| Blaine Fineness, | | | | |

TABLE I-continued

| Miscellaneous Properties of Kiln Dust | | | | |
|---|---|---|---|---|
| | Kiln Dust | | | |
| | M | T | R | L |
| $cm^2/gm$: | 5890 | 6910 | 10,810 | 7160 |
| 325 Fineness, % | 38.3 | 29.6 | 3.4 | 19.0 |

M = Kiln dust from the Martinsburg, W. VA cement plant of Martin Marietta Corporation
T = Kiln dust from the Thomaston, ME cement plant of Martin Marietta Corporation
R = Kiln dust from the Roberta cement plant of Martin Marietta Corporation, located at Colera, AL
L = Kiln dust from the Lyons CO cement plant of Martin Marietta Corporation It is noted that the process of the present invention permits the use of any cement kiln dust, but particularly those from pre-heater, pre-calciner cement plants. With Type III cement in a 1:10 mix, cement content can range from 30 to 50%, while 40% is preferred. Corresponding ranges of cement kiln dust are from 70 to 50%, with 60% preferable. Block proportions may range from 1:10 to 1:12, with 1:11 the preferred proportion of cement plus cement kiln dust to aggregate, when the cement and kiln dust contents are equal.

Laboratory studies shown in Table II for concrete blocks comprising 10 parts aggregate to 1 part binder (cement plus cement kiln dust or fly ash), indicate that fly ash may be replaced by cement kiln dust on an equal basis, as illustrated in tests 1 and 2, while increasing compressive strength by 16% when product cement is used. Further, tests 3 and 4 indicate that cement content may be reduced by 10 to 20% while increasing strength of the units. Test 5 shows an 11% improvement when a standard, more coarsely ground Type I Cement was employed. Thus, use of this type of cement improves the economy of the operation further.

Results shown in Table III indicate that cement content may be reduced by increasing the amount of aggregate used in the block. With Type III cement, a 1:11 (binder to aggregate) mix increased compressive strength 26% over the 1:10 mix using fly ash (test 12 vs test 8). With Type I cement, equality with fly ash was achieved in a 1:10 mix (test 15 vs test 8).

After successful completion of laboratory scale testing of the concept of the present invention, full scale prototypes of 8×8×16 inch concrete blocks were prepared at a commercial block production facility. Previously, the fly ash bin of the facility had been emptied, and 25,920 lbs of cement kiln dust from the Lyons, Colo. cement plant of Martin Marietta Corporation was delivered by truck tanker and pumped into the fly ash bin. The temperature of the cement kiln dust ranged from 104° to 112° F.

TABLE II

| | Compressive Strength of 1:10 Concrete Blocks With Various Binder Proportions | | | | | | | | | | |
|---|---|---|---|---|---|---|---|---|---|---|---|
| | Lyons | Bridger | Lyons | W/C | Block Weight | | | Compressive Strength, 1-Day | | | |
| Test No. | Cement % | Fly Ash % | CKD % | Ratio % | 1 lb | 2 lb | Avg lb | 1 psi | 2 psi | Avg psi | Avg % |
| Lyons Type III Cement | | | | | | | | | | | |
| 1 | 50 | 50 | 0 | 50 | 33.4 | 33.9 | 33.6 | 470 | 470 | 470 | 100 |
| 2 | 50 | 0 | 50 | 75 | 33.6 | 33.5 | 33.6 | 580 | 515 | 550 | 116 |
| 2 | 40 | 0 | 60 | 75 | 34.8 | 33.9 | 34.4 | 585 | 550 | 570 | 121 |
| 4 | 30 | 0 | 70 | 75 | 34.3 | 33.2 | 33.8 | 495 | 475 | 485 | 103 |
| Lyons Type I Cement | | | | | | | | | | | |
| 5 | 50 | 0 | 50 | 66 | 33.5 | 33.4 | 33.4 | 520 | 515 | 520 | 111 |
| 6 | 40 | 0 | 60 | 66 | 32.8 | 33.1 | 33.0 | 410 | 470 | 440 | 94 |
| 7 | 30 | 0 | 70 | 66 | 33.2 | 33.2 | 33.2 | 395 | 380 | 390 | 83 |

TABLE III

Effect of Block Proportions on Compressive Strength

| Test No. | Cement Agg. Ratio | Lyons Cement % | Bridger Fly Ash % | Lyons CKD % | W/C Ratio % | Block Weight 1 lb | Block Weight 2 lb | Block Weight Avg lb | Compressive Strength, 1-Day 1 psi | 2 psi | Avg psi | Avg % |
|---|---|---|---|---|---|---|---|---|---|---|---|---|
| | | | | | Bridger Fly Ash | | | | | | | |
| 8 | 1:10 | 50 | 50 | 0 | 50 | 33.4 | 33.9 | 33.6 | 470 | 470 | 470 | 100 |
| 9 | 1:11 | 50 | 50 | 0 | 55 | 34.4 | 34.3 | 34.4 | 485 | 570 | 530 | 113 |
| 10 | 1:12 | 50 | 50 | 0 | 60 | 34.0 | 33.8 | 33.9 | 435 | 415 | 425 | 90 |
| | | | | | Lyons Type III Cement | | | | | | | |
| 11 | 1:10 | 50 | 0 | 50 | 75 | 33.6 | 33.5 | 33.6 | 580 | 515 | 550 | 117 |
| 12 | 1:11 | 50 | 0 | 50 | 82 | 34.6 | 34.6 | 34.6 | 565 | 610 | 590 | 126 |
| 13 | 1:12 | 50 | 0 | 50 | 90 | 34.7 | 33.7 | 34.2 | 555 | 470 | 515 | 110 |
| | | | | | Lyons Type I Cement | | | | | | | |
| 14 | 1:10 | 50 | 0 | 50 | 66 | 33.5 | 33.4 | 33.4 | 520 | 515 | 520 | 111 |
| 15 | 1:11 | 50 | 0 | 50 | 73 | 34.8 | 34.2 | 34.5 | 435 | 505 | 470 | 100 |
| 16 | 1:12 | 50 | 0 | 50 | 80 | 33.9 | 34.2 | 34.0 | 405 | 425 | 415 | 88 |

Initially, the plant was producing block with a Columbia Machine using 100% Lyon's Type III Cement at 650 lbs per batch. A 1:10 mixture was being achieved by volumetric batching. Aggregate was proportioned 64 parts expanded shale and 16 parts of a natural sand. The Columbia Machine adjusted water automatically by a conductivity probe that measured moisture content of the damp concrete mixture. Protex air-entraining agent was dosed at the rate of 21 oz per batch to achieve the desired texture.

Five experimental batches were mixed. The first batch used 50% Type III cement and 50% cement kiln dust in a 1:10 mixture—325 lbs of each cementitious material. Concrete was mixed 7 minutes prior to use and it was consumed in 10 minutes with a cycle time per pair of block of 8 to 9 seconds. Color of the block was equal to that of 100% cement. Surface texture was considered equal, corners were sharp, and the excess concrete brushed clean with no tearing.

The second batch was also a 1:10 mixture but the cementitious component was adjusted to 40% Type III cement and 60% cement kiln dust—260 and 390 lbs, respectively. This batch was mixed 5 minutes before use and it took 15 minutes to consume it. Cycle time remained at 8 to 9 seconds. Mixing water did not vary from the first batch. Color appeared slightly darker. Other comments of physical appearance were the same as the first batch.

The third batch shifted to a 1:11 mixture with 50% cement and 50% cement kiln dust—300 lbs of each. Water content did not change. The batch was mixed 9 minutes prior to use and took 12 minutes to consume, during which a slight delay occurred due to a machinery malfunction. Cycle time was still 9 to 10 seconds. Color of the block returned to normal. Other coments were the same.

With batch four, a 1:11 batch, the cementitious component was adjusted to 40% Type III cement and 60% cement kiln dust—240 and 360 lbs, respectively. Water content and cycle time remained unchanged as did other comments describing the block. The batch was mixed 9 minutes prior to use and was consumed in 10 minutes.

When the curing kiln was opened the next morning, all blocks were still damp—normally they are dry. For that reason, they were cured an additional three hours in $CO_2$ ladden air at 150° F., after which 10 blocks from each batch were selected for test.

TABLE IV

Physical Properties of Concrete Block

| Batch No. | Cement % | CKD % | Block Weight, lb 1 | 2 | Avg. | Compressive Strength, psi at 2 days 1 | 2 | Avg. |
|---|---|---|---|---|---|---|---|---|
| | | | 1:10 Proportions | | | | | |
| 0 | 100 | 0 | 25.5 | 25.1 | 25.3 | 850 | 780 | 815 |
| 1 | 50 | 50 | 24.6 | 25.1 | 24.9 | 600 | 610 | 605 |
| 2 | 40 | 60 | 24.1 | 24.3 | 24.2 | 500 | 480 | 490 |
| | | | 1:11 Proportions | | | | | |
| 3 | 50 | 50 | 25.3 | 25.4 | 25.4 | 610 | 600 | 605 |
| 4 | 40 | 60 | 25.6 | 25.6 | 25.6 | 535 | 535 | 535 |

When tested in compression at two days age all blocks including those made with 100% Type III cement were low strength—normally 1050 to 1100 psi is obtained. Also, all units were light in weight—26.8 lbs is usual. The concrete was still damp when broken open. The data are shown in the attached Table IV.

A second full-scale production of 8×8×16 inch concrete block was made. A second production of block was considered necessary because the weight of the units was too low and the $CO_2$ curing system malfunctioned previously. Sufficient cement kiln dust was available from the previous shipment for this test.

At the outset of the tests, the plant was producing block with their Columbia Machine using 100% Lyon's Type III Cement at 650 lbs per batch or yard. A 1:10 mixture was being achieved by volumetric batching. In order to increase the weight of the block, aggregate proportions were changed from 64 parts expanded shale and 16 parts sand to 61 parts shale and 19 parts sand. Protex air-entraining agent was still dosed at the rate of 21 oz per batch and water was adjusted automatically by a conductivity probe in the mixer. As shown in the attached Table V the block weighed 29.4 lbs and lost 2.0 lbs during curing. At 2 days age (1 day cure plus 1 day dry), the units weighed about the same and had a compressive strength of 935 psi. At 28 days age (1 day cure plus 27 days dry), they lost an additional 1.1 lbs and had a compressive strength of 1180 psi. A 1000 psi minimum, is required by ASTM Specification C 90.

Six experimental batches were then mixed. The first batch used 50% Type III cement and 50% cement kiln dust in a 1:10 mixture—325 lbs of each cementitious component per yard. Concrete was mixed 12 minutes prior to use and it was consumed in 9 minutes with a cycle time of 8 to 9 seconds. Color of the block was considered to be slightly darker than 100% cement.

However, surface texture was equal, corners were sharp, and the excess concrete brushed off with no tearing. The blocks weighed 29.3 lbs and lost 1.8 lbs during curing. At 28 days age, they lost an additional 1.3 lbs and had a compressive strength of 1145 psi.

The second batch was also a 1:10 mixture but the cementitious component was adjusted to 40% Type III cement and 60% cement kiln dust—260 and 390 lbs, respectively. This batch was mixed 7 minutes prior to use and took 15 minutes to consume with a cycle time of 9 to 10 seconds. Mixing water did not vary from the first batch. Other comments concerning physical appearance were also the same. The blocks weighed 28.9 lbs and lost 2.0 lbs during curing. At 28 days age, they lost an additional 0.7 lbs and had a compressive strength of 995 psi.

On the third batch, proportions were changed to 1:11 with 50% cement and 50% cement kiln dust or 300 lbs of each per yard. Water content did not change. The batch was mixed 16 minutes prior to use and was consumed in 10 minutes at a cycle time of 9 to 10 seconds. Other comments were unchanged. The block weighed 29.2 lbs and lost 2.5 lbs during curing. At 28 days age, they lost an additional 0.3 lbs and had a strength of 1040 psi.

With the fourth batch, also a 1:11 mixture, 40% Type III cement and 60% cement kiln dust were used—240 and 360 lbs per yard, respectively. Water content and cycle time remained unchanged as did other comments describing the physical appearance of the block. The batch was mixed 18 minutes prior to use and was consumed in 9 minutes. Feed time or time to fill the mold box was now reduced 0.5 seconds. The blocks weighed 29.3 lbs and lost 2.5 lbs during curing. At 28 days age, they lost an additional 0.8 lbs and had a strength of psi.

The fifth and sixth batches had 1:12 proportions. Batch five contained 50% cement and 50% cement kiln dust or 275 lbs of each. It was mixed 13 minutes prior to use and was consumed in 12 minutes with a 9 to 10 second cycle time. The block weighed 29.5 lbs and lost 3.7 lbs during curing. At 28 days age, they weighed the same and had a strength of 820 psi.

The sixth and final batch container 40% cement and 60% cement kiln dust—220 and 330 lbs per yard, respectively. It was mixed 11 minutes prior to use and was consumed in 11 minutes with a 9 to 10 second cycle time. Feed time increased 0.5 seconds with this batch.

TABLE V

| Batch No. | Cement % | CKD % | Curing Condition | Block Weight, lb | | | Compressive Strength, psi | | |
|---|---|---|---|---|---|---|---|---|---|
| | | | | 1 | 2 | Avg. | 1 | 2 | Avg. |
| 0 | 100 | 0 | Fresh | 28.3 | 30.0 | 29.4 | — | — | — |
| | | | Cured | 27.5 | 27.3 | 27.4 | — | — | — |
| | | | 1-Day Dry | 27.4 | 27.2 | 27.3 | 915 | 955 | 935 |
| | | | 6-Day Dry | 26.4 | 26.7 | 26.6 | 1055 | 1110 | 1080 |
| | | | 27-Day Dry | 26.1 | 26.2 | 26.2 | 1175 | 1190 | 1180 |
| 1 | 50 | 50 | Fresh | 29.5 | 29.1 | 29.3 | — | — | — |
| | | | Cured | 27.4 | 27.7 | 27.5 | — | — | — |
| | | | 1-Day Dry | 28.2 | 28.4 | 27.5 | 920 | 940 | 930 |
| | | | 6-Day Dry | 27.6 | 27.4 | 26.7 | 1040 | 1030 | 1035 |
| | | | 27-Day Dry | 26.8 | 27.1 | 26.2 | 1105 | 1185 | 1145 |
| 2 | 40 | 60 | Fresh | 28.9 | 28.8 | 28.9 | — | — | — |
| | | | Cured | 27.2 | 26.7 | 26.9 | — | — | — |
| | | | 1-Day Dry | 27.1 | 26.6 | 26.8 | 825 | 875 | 850 |
| | | | 6-Day Dry | 26.6 | 26.4 | 26.5 | 915 | 940 | 930 |
| | | | 27-Day Dry | 26.2 | 26.2 | 26.2 | 985 | 1005 | 995 |
| 3 | 50 | 50 | Fresh | 29.2 | 29.2 | 29.2 | — | — | — |
| | | | Cured | 27.0 | 26.3 | 26.7 | — | — | — |
| | | | 1-Day Dry | 27.1 | 27.5 | 26.7 | 875 | 815 | 845 |
| | | | 6-Day Dry | 26.8 | 27.4 | 26.5 | 875 | 1060 | 970 |
| | | | 27-Day Dry | 26.6 | 26.6 | 25.8 | 1000 | 1075 | 1040 |
| 4 | 40 | 60 | Fresh | 28.8 | 29.7 | 29.3 | — | — | — |
| | | | Cured | 26.7 | 26.9 | 26.8 | — | — | — |
| | | | 1-Day Dry | 26.7 | 27.6 | 26.8 | 790 | 810 | 800 |
| | | | 6-Day Dry | 26.9 | 27.1 | 26.6 | 875 | 910 | 890 |
| | | | 27-Day Dry | 26.4 | 26.4 | 26.0 | 995 | 1000 | 1000 |
| 5 | 50 | 50 | Fresh | 29.5 | 29.4 | 29.5 | — | — | — |
| | | | Cured | 25.2 | 26.4 | 25.8 | — | — | — |
| | | | 1-Day Dry | 26.2 | 25.4 | 25.8 | 825 | 745 | 785 |
| | | | 6-Day Dry | 26.0 | 26.0 | 25.8 | 840 | 865 | 850 |
| | | | 27-Day Dry | 26.2 | 26.0 | 25.8 | 840 | 795 | 820 |
| 6 | 40 | 60 | Fresh | 29.7 | 29.2 | 29.4 | — | — | — |
| | | | Cured | 25.8 | 25.7 | 25.8 | — | — | — |
| | | | 1-Day Dry | 25.9 | 26.3 | 25.8 | 720 | 830 | 775 |
| | | | 6-Day Dry | 25.8 | 25.9 | 25.5 | 815 | 845 | 830 |
| | | | 27-Day Dry | 26.1 | 26.0 | 25.5 | 875 | 825 | 850 |

The blocks weighed 29.4 lbs and lost 3.6 lbs on curing. A further 0.3 lbs weight was lost on drying 27 days and they had a strength of 850 psi.

From the data indicated, it may be seen that acceptable compressive strengths may be obtained in concrete block utilizing cement kiln dust in place of fly ash. While conventional production of concrete block dust utilizes one part cementitious material to 10 parts aggregate, it has been found that the use of cement kiln dust in conjunction with cement permits the production of concrete block from mixtures of one part cementitious material with up to 12 parts aggregate. Conversely, concrete block may also be prepared utilizing lower proportions of aggregate, such as one part cementitious material to 8 parts aggregate.

While the cementitious material may comprise from 0.4 to 0.9 parts cement and 0.6 to 0.1 parts cement kiln dust, it has been found that the preferred range is approximately equal proportions of cement and cement kiln dust. Increasing cement kiln dust content lowers cost, due to the fact that the cement kiln dust is a waste product of cement manufacture.

It has also been found that the present invention is applicable to both low pressure and high pressure steam curing block manufacture operations, and combinations of high and low pressure steam curing utilizing carbon dioxide. It is to be appreciated that variations in water content, concrete mixing, cycle timing, and cure may be made as appropriate to obtain desired results. Further, the use of admixtures, as in conventional block manufacture, is contemplated. Such modifications are to be considered within the scope of the present invention, as are other variations and equivalents which will readily be recognized by one of ordinary skill in the art to which this invention pertains, without departure from the spirit of the invention or the scope of the claims which follow.

What is claimed is:

1. A composition for the manufacture of concrete block, comprising aggregate, cement, and cement kiln dust, wherein the aggregate is present in a proportion of between about 8 to about 12 parts to 1 part of a mixture of cement and cement kiln dust.

2. A composition as set forth in claim 1, wherein said cement kiln dust comprises from about 10 to about 60% of the total weight of cement and cement kiln dust.

3. A composition as set forth in claim 1, wherein said cement kiln dust comprises from about 20 to about 50% of the total weight of cement and cement kiln dust.

4. A composition as set forth in claim 1, wherein said cement and cement kiln dust are present in approximately equal proportions.

5. A composition as set forth in claim 4, wherein said mixture of cement and cement kiln dust and said aggregate are present in a proportion of about 1:10.

6. A composition as set forth in claim 1, further comprising admixtures and water.

7. A concrete block comprising aggregate, cement, and cement kiln dust.

* * * * *